United States Patent [19]

Hochstrasser et al.

[11] Patent Number: 5,111,846

[45] Date of Patent: May 12, 1992

[54] ELECTRICALLY CONTROLLED FITTING

[75] Inventors: Ferdinand Hochstrasser, Auenstein, Switzerland; Helmut Oesterle, Feldkirch, Austria

[73] Assignee: KWC AG, Unterkulm, Switzerland

[21] Appl. No.: 609,913

[22] Filed: Nov. 6, 1990

[30] Foreign Application Priority Data

Nov. 16, 1989 [CH] Switzerland ............. 04125/89

[51] Int. Cl.⁵ .................. F16K 31/10; F16K 31/385
[52] U.S. Cl. ............................... 137/607; 251/65
[58] Field of Search ............. 137/606, 607, 595; 251/65, 38, 33, 41

[56] References Cited

U.S. PATENT DOCUMENTS

| | | | |
|---|---|---|---|
| 2,301,439 | 11/1942 | Moen | 137/607 |
| 2,496,533 | 2/1950 | Hendrickson . | |
| 2,496,553 | 2/1950 | Littlefield | 137/595 X |
| 2,616,710 | 11/1952 | Woodruff . | |
| 3,178,151 | 4/1965 | Caldwell | 251/65 X |
| 3,181,790 | 5/1965 | Smith | 137/607 X |
| 3,306,570 | 2/1967 | Cooksley | 137/606 X |
| 3,472,277 | 10/1969 | Reinicke et al. | 137/595 |
| 3,550,901 | 12/1970 | McIntosh | 251/38 |
| 3,667,722 | 10/1970 | Katz . | |
| 3,977,436 | 8/1976 | Larner | 251/65 X |

FOREIGN PATENT DOCUMENTS

2902410 7/1980 Fed. Rep. of Germany .
3507144 9/1985 Fed. Rep. of Germany ...... 137/607
2334037 12/1975 France .

*Primary Examiner*—Stephen M. Hepperle
*Attorney, Agent, or Firm*—Barnes & Thornburg

[57] ABSTRACT

The fitting has in each case a hydraulically operable shutoff valve (40, 42) for hot and cold water. The diaphragm-shaped closure part (56) interacts with the valve seat (52). Provided on the side opposite the valve seat (52) is a pilot control space (60) which is connected through the passage (62) to the annular channel (48) and the corresponding feedline (20). Via control lines (86'), each pilot control space (60) is connected to the outlet line (24) via an auxiliary valve (70'). The two auxiliary valves (70') are constructed on a ceramic disk valve (72) and can be operated jointly. When the auxiliary valves (70, 70') are closed, the pressure in the pilot control space (60) corresponds to the pressure in the annular channel (48), the shutoff valves (40, 42) are closed. By rotating the operating shaft (86) the two auxiliary valves (70') are opened, by which means the pressure in the pilot control spaces (60) drops. The closure part (56) is lifted from the relevant valve seat (52) and the shutoff valves (40, 42) are opened. When the auxiliary valves (70') are closed by rotating the operating shaft (86), the pressure in the pilot control spaces (60) rises again, by which means the shutoff valves (40, 42) are closed. The joint operation of both shutoff valves (70, 70') requires extremely little energy.

14 Claims, 9 Drawing Sheets

ELECTRICALLY CONTROLLED FITTING

The present invention relates to an electrically controlled fitting according to the preamble of claim 1.

Fittings of this type are commercially obtainable For the hot water and the cold water respectively, they have a hydraulically operable shutoff valve with an integrated auxiliary valve which is opened by means of a solenoid to open the shutoff valve. To interrupt the water flow, the solenoid is switched off, which causes the auxiliary valve and the shutoff valve actuated by the latter to be closed. The solenoids are actuated by an electronic control having a sensor, the water flow being released as long as the sensor detects hands to be washed in the region of the fitting. The shutoff valves each have a diaphragm-shaped closure part which interacts with a stationary, annular valve seat. Extending around the valve seat is an annular channel which is connected to the relevant water inlet. Arranged in the interior of the valve seat is an exit opening which opens out via a line into a mixing valve. In the mixing valve, the hot water and cold water are mixed and the mixed water is fed to the outlet With regard to the closure part, a pilot control space is provided on the side located opposite the valve seat, which pilot control space is connected in terms of flow to the annular channel via a small passage in the valve seat. In the region of the exit opening, the closure part has a further opening which is bounded by an auxiliary valve seat. The cross-sectional flow of this opening is greater than the cross-sectional flow of the passage. The valve seat interacts with a plunger-shaped closure element which is lifted from the auxiliary valve seat when the solenoid is excited and comes to rest on the auxiliary valve seat again when the solenoid is deexcited. When the auxiliary valve is closed, the pressure in the interior of the pilot control space corresponds to the pressure of the water fed through the relevant inlet. As a result of the difference in surface area of the mutual application of pressure of the diaphragm-shaped closure part in the region of the annular channel or of the pilot control space, the closure part is pressed onto the valve seat. To open the shutoff valve, the closure element is lifted from the auxiliary valve seat by excitation of the solenoid. By this means, the pilot control space is connected to the outlet which results in the pressure in the pilot control space dropping By this means, the closure part is lifted from the valve seat and the water flow from the annular channel into the exit opening is released. As soon as the closure element comes to rest again on the auxiliary valve seat due to deexcitation of the solenoid, the pressure in the pilot control space rises again which results in the closure part coming to rest on the valve seat. A considerable amount of electric energy is required to operate this fitting, which necessitates a supply device driven by the mains electricity.

It is therefore an object of the present invention to provide a fitting of the generic type which requires less energy for the operation of the shutoff valves. By this means, the operation of the fitting of this type using a battery or an accumulator is to be guaranteed over a relatively long time.

The object is achieved by the features of the defining part of claim 1.

The two auxiliary valves are operated by means of a single, common drive arrangement fed by electricity. A common drive arrangement for both auxiliary valves requires less electric energy than two individual drive arrangements for the auxiliary valves. Moreover, a simple construction of the fitting is achieved Preferred embodiments of the present invention are indicated in the dependent claims The invention is now explained in greater detail with reference to exemplary embodiments illustrated in the purely diagrammatic drawings, in which:

Figure 1:
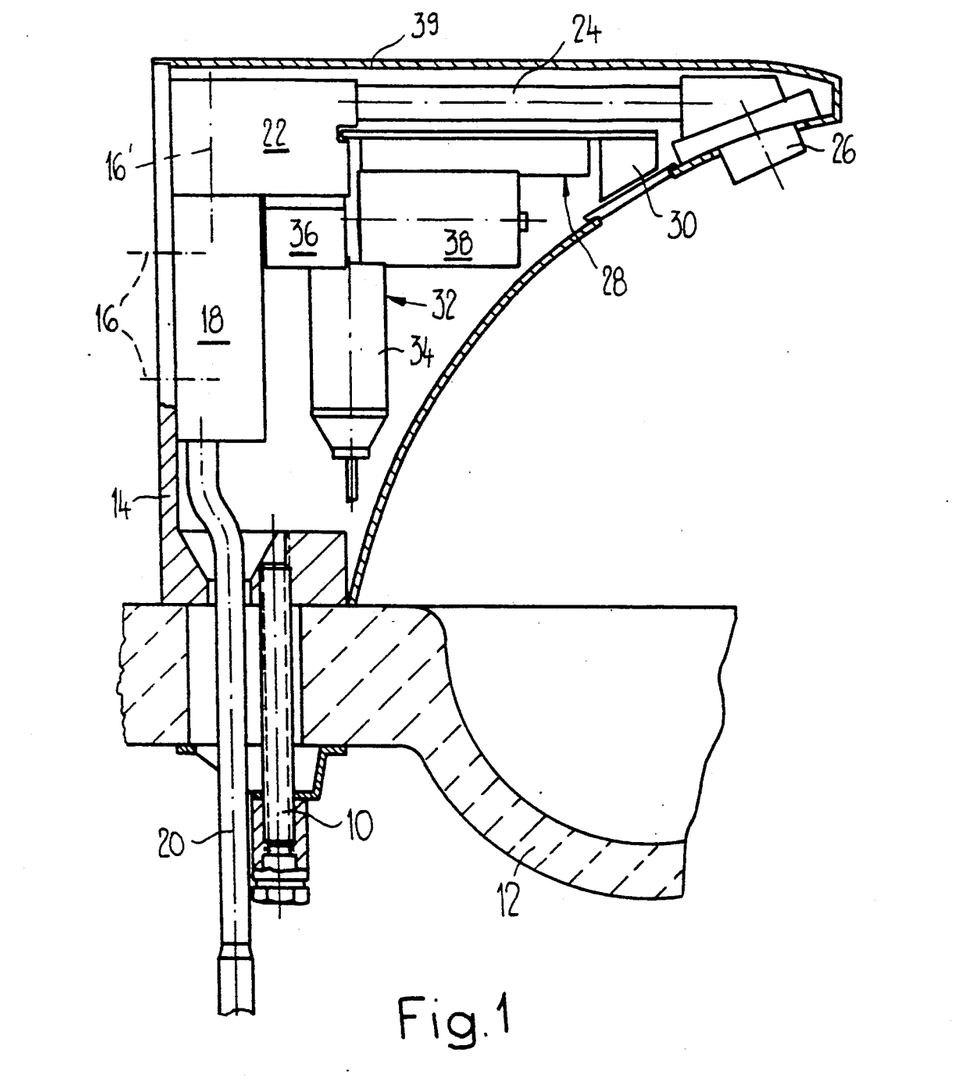
FIG. 1 shows a simplified illustration of a fitting from a front view and partially cut open.

The sanitary fitting shown in FIG. 1 has an L-shaped bearing part 14 which is attached to a washbasin 12 by means of a screw bolt 10. Attached to the bearing part 14 by means of screws 16 indicated in dot-dash lines is a shutoff valve block 18 into which a feedline 20 opens out in each case for the cold water and the hot water. Only one of these feedlines 20 is visible. Seated on the shutoff valve block 18 is an auxiliary valve block 22 which is attached to the shutoff valve block 18 by means of screws 16' indicated in dot-dash lines. Leading from the auxiliary valve block 22 to a water outlet head is an outlet line 24. Held by the auxiliary valve block 22 is an electronic control arrangement 28, which is only shown diagrammatically and which has a sensor 30, which sensor detects whether or not there are hands to be washed in the region of the washbasin 12. A drive arrangement 32 for the auxiliary valves provided in the auxiliary valve block 22—these are described in greater detail further below—has a drive member 34 constructed as a direct current motor with an integrated reducing gear and a transmission element 36 indicated diagrammatically which connects the drive member 34 to the auxiliary valves. The control arrangement 28 and the drive member 34 are fed by a battery 38. The active parts of the fitting are covered by a detachable hood 39.

Figures 2, 4, 5:
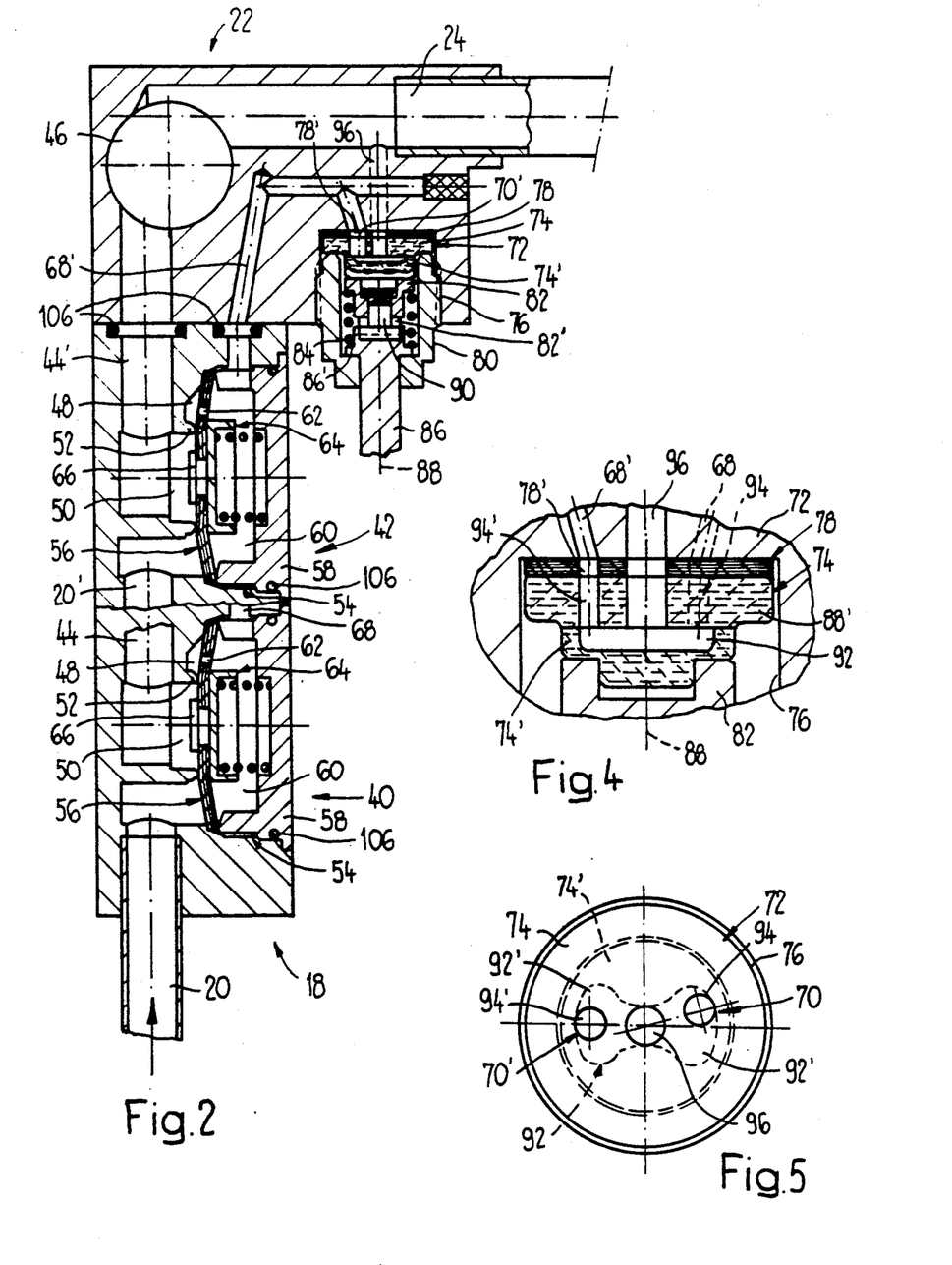
FIGS. 2 and 3 show a part of the fitting according to FIG. 1 in a vertical section and in a lateral section respectively, the flow paths being shown placed in the sectional plane.
FIGS. 4 and 5 show a section and a plan view respectively of a ceramic disk valve.
Figure 3:
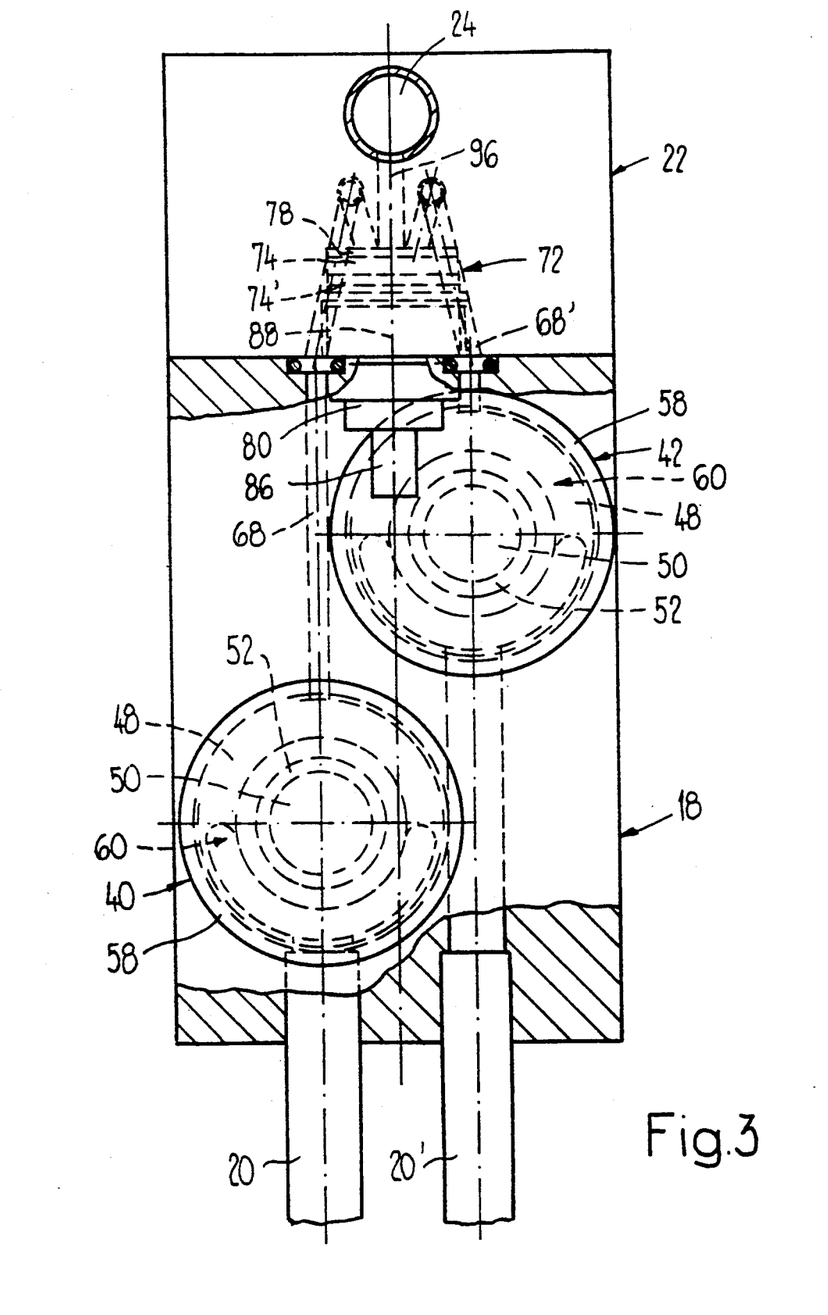
Figure 8:
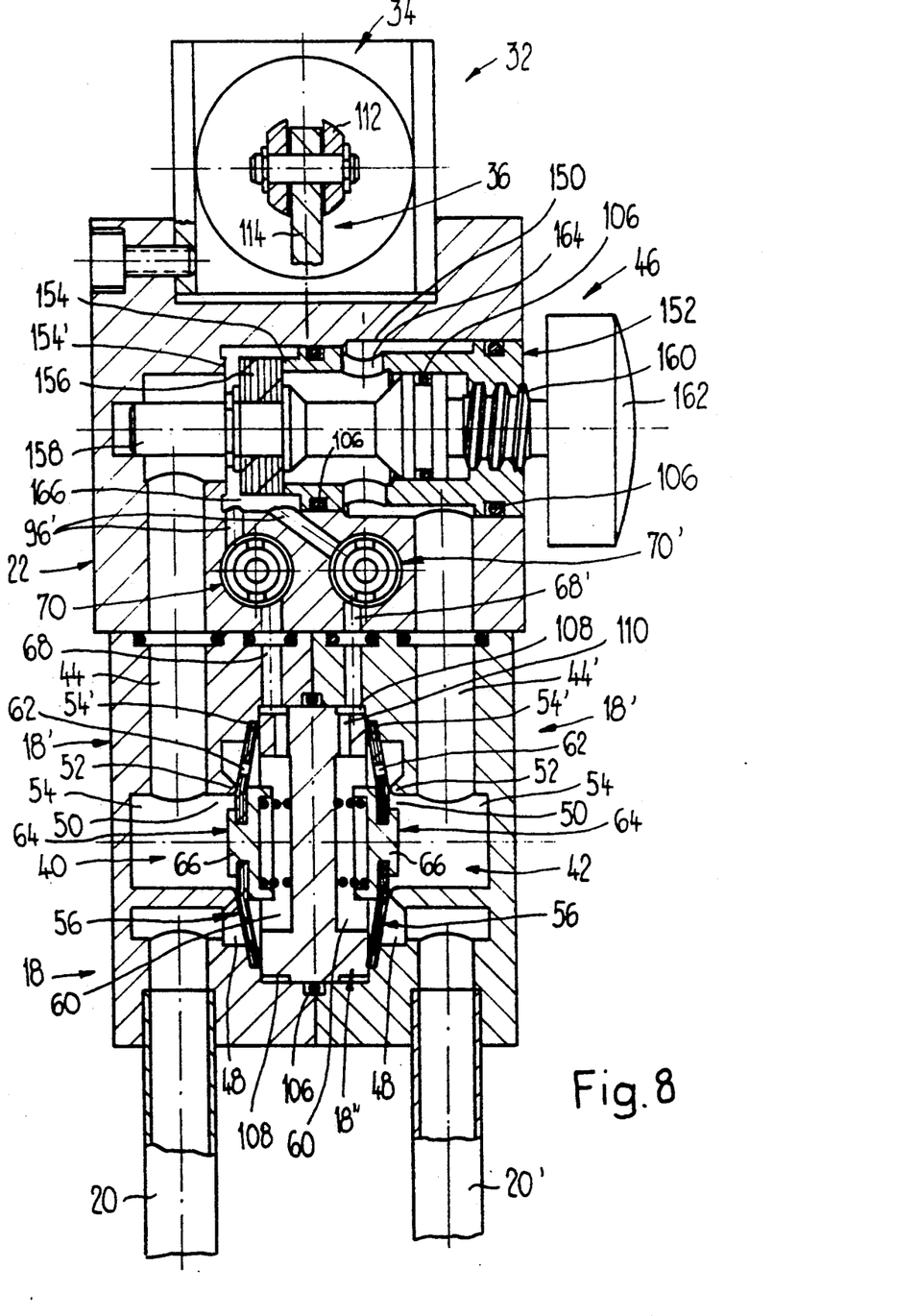

The shutoff valve block 18 and the auxiliary valve block 22 are illustrated enlarged in FIGS. 2 and 3. Provided in the shutoff valve block 18 is a first shutoff valve 40 for the hot water and a second shutoff valve 42 for the cold water. These are arranged mutually laterally offset one above the other and are connected on the inlet side to the relevant feedline 20 for the hot water and 20' for the cold water. On the outlet side, the two shutoff valves 40, 42 are in flow connection via lines 44, 44' worked into the shutoff valve block 18 and auxiliary valve block 22 with a mixing valve 46 provided in the auxiliary valve block 22 and indicated in FIG. 2. The mixing valve 46 opens out into the outlet line 24. A possible embodiment of the mixing valve 46 is illustrated in FIG. 8 and described in greater detail further below.

Each shutoff valve 40, 42 has an annular channel 48 connected to the relevant feedline 20, 20' and an exit 50 arranged in between, of approximately circular cross-section and connected to the corresponding line 44, 44'. The exit 50 is separated from the annular channel 48 by an annular valve seat 52. The annular channel 48, exit 50 and valve seat 52 are constructed in the bottom region of an essentially cylindrical, stepped recess 54 worked into the shutoff valve block 18. Inserted in the recess 54 is a closure part 56 constructed as a rubber elastic diaphragm which interacts with the valve seat 52 and covers the annular channel 48 and the exit 50. The diaphragm-shaped closure part 56 is held along its periphery by a lid 58 screwed into the shutoff block 18, which lid bounds a pilot control space 60 on the side of the closure part 56 facing away from the valve seat 52. The pilot control space 60 is connected via a small passage 62 in the closure part 56 to the annular channel 48 and thus the relevant feedline 20, 20'. On the side of the pilot control space, the rubber elastic closure part 56 is reinforced in the region of the valve seat 52 and the exit 50 by means of a plate-shaped reinforcing member 64. Provided in the pilot control space 60 is a compression spring 65 supported on the reinforcing member 64 and the lid 58, which compression spring applies a slight force on the closure part 56 against the valve seat 52. The reinforcing member 64 has a head-shaped extension 66, by means of which it is held in a watertight manner in a central opening in the closure part 56.

The two pilot control spaces 60 are each connected via their own control line 68 or 68' worked into the shutoff block 18 and the auxiliary valve block 22 to an auxiliary valve 70 or 70' provided in each case in the auxiliary valve block 22. The two auxiliary valves 70, 70' are worked out of a ceramic disk valve 72 which is illustrated enlarged in FIGS. 4 and 5.

The ceramic disk valve 72 has two ceramic disks 74, 74' which rest on each other and which are inserted in a cylindrical recess 76 in the auxiliary valve block 22. The first ceramic disk 74 lies flat on a disk-shaped, rubber elastic seal 78 which rests on the other side on the flat bottom of the recess 76. This ceramic disk 74 is pressed toward the seal 78 and the bottom of the recess 76 and held in a stationary manner via a retaining nut 80 of sleeve-shaped construction which is screwed into the auxiliary valve block 22. The other ceramic disk 74' is of smaller diameter than the ceramic disk 74, lies flat on the latter and is arranged in the interior of the sleeve-shaped retaining nut 80. The ceramic disk 74' is connected fixedly in terms of rotation to a carrier 82, for example via a hexagonal or rectangular connection. The one end of a compression spring 84 rests on the carrier 82, by means of which compression spring the ceramic disk 74' is pressed against the ceramic disk 74. An operating shaft 86 is mounted in the sleeve-shaped retaining nut so as to be rotatable about the axle 88. Said axle is perpendicular to the surfaces 88', with which the ceramic disks 74, 74' rest on each other. The operating shaft 86 is flattened off at its end region facing the carrier 82 at two diametrically opposite zones and it engages in a slot 82' in the carrier 82 forming a connection with said carrier which is fixed in terms of rotation. Furthermore, the operating shaft 86 has at this end a journal 90 projecting in the axial direction over the flattened off zones, which journal engages in a corresponding hole in the carrier to guide said carrier 82. Furthermore, a collar 86' is molded onto the operating shaft 86, on which collar the end of the compression spring 84 which is remote from the carrier 82 rests and by means of which collar the operating shaft 86 is held in the retaining nut 80 against the force of the compression spring 84.

The movable ceramic disk 74' has a control groove 92 which is open toward the ceramic disk 74, is otherwise closed, extends in the direction of the diameter and has at its radial ends a broadening 92' (cf. in particular FIG. 5). Provided in the stationary ceramic disk 74 are two control passages 94, 94' which are connected in terms of flow to the relevant control line 68 or 68' through holes 78' in the seal 78. The two control passages 94, 94' are located approximately diametrically opposite each other but slightly offset relative to the axle 88. The control passages 94 interact in the region of the widenings 92' with the control groove 92. The latter is permanently connected via a central passage 96 in the control disk 74 to the outlet line 24.

In the position of rotation shown in the figures of the ceramic disk 74' relative to the fixed ceramic disk 74, the control lines 68, 68' are in flow connection with the outlet line 24 due to the control passages 94, 94' and the control groove 92 and the common central passage 96. If, in contrast, the ceramic disk 74' is rotated clockwise about the rotating axle 88 (FIG. 5), the control passage 94 is firstly separated from the corresponding widening 92' and the other control passage 94' is only interrupted when the ceramic disk 74' is rotated further in the same direction. During counter clockwise rotation, the control passage 94' consequently firstly comes into connection with the corresponding widening 92' and the control passage 94 is only opened later. This results in the control line 68' connected to the shutoff valve 42 for the cold water always first being connected to the outlet line 24 when the ceramic disk valve 74 is opened and the control line 68 connected to the shutoff valve 40 for the hot water always being interrupted first when the ceramic disk valve 72 is closed.

Figure 6:
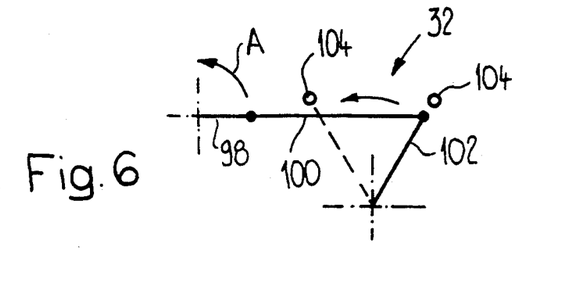
FIG. 6 shows a diagrammatic illustration of a crank drive to operate the ceramic disk valve.

In FIG. 6, the drive arrangement 32 for the ceramic disk valve 72 is illustrated diagrammatically. Attached to the output shaft of the drive member 34 constructed as a direct current gear motor (cf. FIG. 1) is a crank 98 which is linked via a coupler 100 to a rocker 102 arranged on the operating shaft 86 of the ceramic disk valve 72 When the crank 98 is rotated in the direction of the arrow A by 180°, the rocker 102 is swivelled from the position illustrated by uninterrupted lines in FIG. 6 into the position indicated in dashed lines, which results in the ceramic disk 74' being rotated by the same angle (approximately 60°) in relation to the fixed ceramic disk 74. When the crank 98 is rotated further in the direction of the arrow A by a further 180°, the rocker 102 is rotated back into its original position. A crank mechanism of this type has the advantage that, when the crank 98 is swivelled out of those positions in which the longitudinal extensions of the crank 98 and coupler 100 conform, large torques can be exerted on the rocker 102 with relatively small torques acting on the crank 98. Even if the ceramic disks 74, 74' should adhere to each other, this adhesion can thus be removed with a low energy consumption. Furthermore, the direct current motor 34 can always be driven in the same direction of rotation. Arranged at the free ends of the rocker 102 is a small permanent magnet (not shown) which operates a reed relay 104 arranged fixedly there when the rocker 102 reaches an end position. This enables a simple actuation of the drive 34.

For reasons of completeness, it should also be mentioned that the lines 44, 44' and control lines 68, 68' are sealed off by means of O-rings 106 at the transition points from the shutoff valve block 18 to the auxiliary valve block 22. O-rings 106 are also provided in the region of the lid 58 in order to seal off the pilot control spaces 60.

The fitting illustrated in FIGS. 1 to 6 operates as follows: if the two auxiliary valves 70, 70' are closed by the control passages 94, 94' being brought out of the overlapping position with the control groove 92, the hydraulic control circuit, i.e. feedline 20, 20'—passage 62 in the closure part 56—pilot control space 60—control line 68, 68'—control groove 92—central passage 96—outlet line 40, is interrupted. Due to the passage 62, the pressure in the annular channel 68 and pilot control space 60 is balanced. Due to the difference in surface area between the annular channel 48 and the surface of the closure part 56 on the side of the pilot control space, and supported by the compression spring 65, the closure part 56 is pressed against the valve seat 52 essentially proportionally to the difference between the water pressure in the feedline 20, 20' and the water pressure in the outlet line 24—this corresponds essentially to the ambient pressure. In this case, the reinforcing member 64 prevents overloading and bulging out of the rubber elastic closure part 56. The two shutoff valves 40, 42 are closed and the flow of water is interrupted.

If the hands to be washed are now placed in the detection range of the sensor 30, the control arrangement 28 feeds the drive member 34 until the rocker 102 is swivelled into its other end position. As soon as this end position is reached, the relevant reed relay 104 passes a signal to the control arrangement 28, which signal switches off the drive member 34. Due to this swivelling of the rocker 102, the ceramic disk 74' was also rotated about the axle 88 relative to the fixed ceramic disk 74. During this rotation, the hydraulic control circuit of the shutoff valve 42 for cold water is firstly closed and subsequently the control circuit of the shutoff valve 40 for hot water. By this means, the pilot control spaces 60 are now connected to the outlet line 24 via the control lines 68, 68', the ceramic disk valve 72 and the central passage 96. Since the cross-section of this part of the control circuit is larger than the cross-section of flow of the passage 62, more water is let off from the pilot control space 60 than can enter into the relevant pilot control space 60 through the passage 62 from the feedline 20, 20'. Thus the pressure in the relevant pilot control space 60 reduces, which results in the diaphragm-shaped closure part 56 being lifted from the valve seat 52 against the force of the compression spring 65. The water fed in can now flow from the annular channel 48 into the exit 50 and thus through the lines 44, 44' to the mixing valve 46. In the mixing valve 46, the hot water and cold water are mixed and the mixed water is conducted through the outlet line 24 to the water outlet head 26. Since the pressure in the pilot control spaces is slowly reduced when the auxiliary valves 70, 70' are opened, the shutoff valves 40, 42 are opened slowly, which prevents pressure surges in the feedlines 20, 20'.

If the hands are now removed from the detection range of the sensor 30, the latter passes a signal to the control arrangement 28 which sets the drive member 34 in motion. In this case, the rocker 102 is swivelled back into the original position, which results in the auxiliary valve 70 assigned to the control circuit of the shutoff valve 40 for hot water being closed first and subsequently the other auxiliary valve. When the relevant auxiliary valve 70, 70' is closed, the relevant control circuit is interrupted, which results in the pressure in the pilot control space 60 due to the passage 62 rising again to the pressure of the water in the annular channel 48. In accordance with the slow rise of pressure in the pilot control space 60, the closure part 56 is moved against the valve seat 52 until said closure part rests snugly on said valve seat. Due to the displacement of the closure part 56, the quantity of water flowing from the feedline 20, 20' to the mixing valve 46 is continuously reduced. In this case, pressure surges in the feedlines 20, 20' are again avoided. The two shutoff valves 40, 42 now block the flow of hot and cold water one after the other. Due to the respective prior opening of the shutoff valve 42 for cold water and the respective prior closing of the shutoff valve 40 for hot water, scalding the hands is avoided.

The drive member 34 is only switched on for a short time, it drives both auxiliary valves 70, 70' jointly via the transmission element 36 and the ceramic disk valve 72 requires small forces for the operation with the result that the fitting shown in FIGS. 1 to 6 requires only an exceptionally low energy consumption.

In the fittings illustrated in the further figures, parts of identical function as in the fitting according to FIGS. 1 to 6 are given the same reference numerals.

Figure 7:
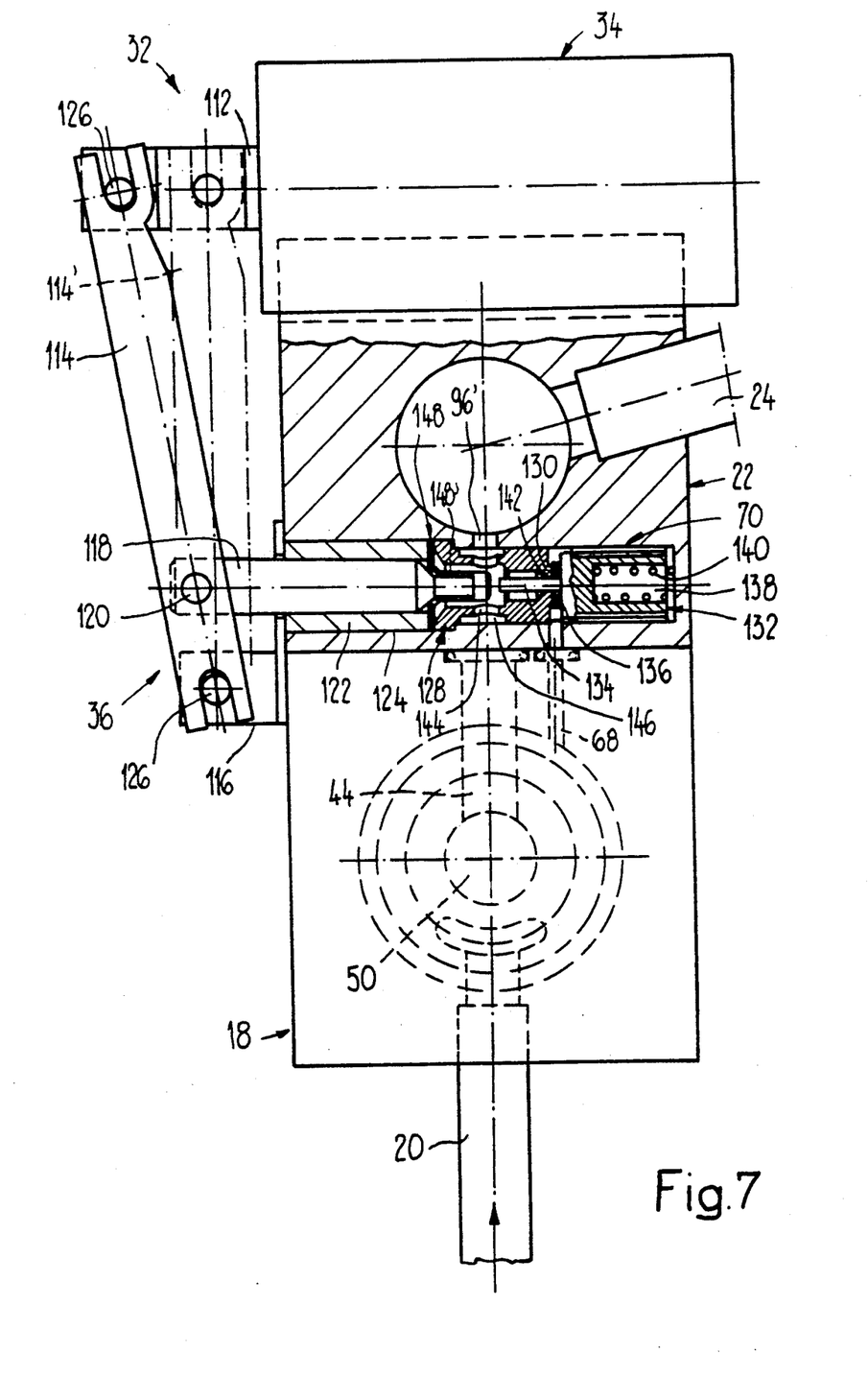
FIGS. 7 and 8 show a further embodiment of the fitting, in a front view partially cut open and in a vertical section with the flow paths placed in the sectional plane, having a solenoid to operate the auxiliary valves

In FIGS. 7 and 8, a further embodiment of the water fitting is illustrated. This, in turn, has a shutoff valve block 18 and an auxiliary valve block 22 resting on and screwed to the latter. The two feedlines 20, 20' for the hot and cold water open out into the shutoff valve block 18 and the outlet line 24 leads away from the auxiliary valve block 22.

The shutoff valve block 18 consists essentially of three parts, namely two identical partial blocks 18', arranged in mirror image, and a central, symmetrical block part 18". Each partial block 18' is assigned a shutoff valve 40, 42; these are separated from each other by the block part 18". In each partial block 18', an annular channel 48 connected to the relevant feedline 20, 20' is constructed in a recess 54 which is approximately cylindrical, is stepped in diameter and is open toward the block part 18", which annular channel is bounded on its inner side, seen in the radial direction, by an annular valve seat 52. The part of the recess 54 bounded by the valve seat 52 on the outside, seen in the radial direction, forms an exit 50 for the flow of water released by the shutoff valve 40, 42. The exits 50 are connected to the mixing valve 46 provided in the auxiliary valve block 22 via lines 44, 44' worked into the partial blocks 18' and the auxiliary valve block. Provided in each recess 54 is a closure part 56 constructed as a diaphragm made of rubber elastic material, which closure part interacts with the relevant valve seat 52. Along its circumferential region, the closure part 56 is fastened in a clamping manner by the block part 18" engaging in the recesses 54 and an annular widening 54' of the recess 54.

The central block part 18' bounds the two pilot control spaces 60 assigned to the shutoff valves 40, 42 and provided with regard to the closure parts 56 on the side facing away from the valve seat 52. Said pilot control spaces are each connected in terms of flow to the annular channel 48 via a passage 62 in the closure part 56. A plate-shaped reinforcing member 64 is attached to the closure part 56 by means of a head-shaped extension 66, which reinforcing member rests on the rubber elastic closure part 56 on the side of the pilot control space essentially in the region of the exit 50 and the valve seat 52. Provided in each case between the reinforcing member 64 and the block part 18" is a compression spring 65. However, in relation to the forces exerted on the closure part 56 by the water pressure, said compression spring has a small compression force.

The essentially cylindrical block part 18" is sealed off along its circumference in the center by means of an O-ring 106 in order to separate the two shutoff valves 40, 42 from each other and, at the same time, to guarantee a sealing off against the outside when the two partial blocks 18' are joined together. Seen in the axial direction of the block part 18", two circumferential grooves 108 are constructed on the outside of said block part, which circumferential grooves are in connection with the relevant pilot control spaces 60 via bore holes 110 extending in the radial direction. These circumferential grooves 108 are connected to the auxiliary valves 70, 70' by the control lines 68, 68' constructed in the partial blocks 118' and in the auxiliary valve block 22. Lines 96' lead from the auxiliary valves 70, 70' to the outlet side of the mixing valve 46.

The drive arrangement 32 for the two auxiliary valves 70, 70' has a drive member 34 constructed as a bistable solenoid and a transmission element 36 constructed as a reducing linkage. The commercially obtainable bistable solenoid has a plunger 112, to the free end of which a one-arm lever 114 is linked which, at the other end, is mounted in a swivelling manner on a bearing element 116 arranged on the auxiliary valve block 22. On each side of this one-arm lever 114, a tappet 118 is linked by means of a common bearing journal 120. The two tappets 118 are arranged adjacently and parallel to each other and are guided displaceably in their longitudinal direction in a bearing sleeve 122. The bearing sleeves 122 are inserted in bore holes 124 extending parallel to each other and arranged adjacently in the auxiliary valve block 22. The position of the lever 114 in a direction at right angles to the bearing journal 120 and to the longitudinal extension of the tappet 118 is thus defined by the bearing sleeve 122. For this reason, the lever 114 is constructed as a fork at both its ends and, seen in the longitudinal direction of the lever 114, is guided freely moveably in the journal 126 attached to the plunger 112 or the bearing element 116. The lever 114 and the tappet 118 are illustrated in their position of rest by uninterrupted lines in FIG. 7. The dot-dashed lines indicate the lever 114 in the operating position 114'. In this position, the tappet 118 is displaced to the right by the corresponding stroke.

The two auxiliary valves 70, 70' are provided in the auxiliary valve block 22 in the interior of the two bore holes 124 arranged adjacently and parallel to each other. In the central region of the bore hole 124 there is an essentially hollow cylindrical insert 128, on which an annular auxiliary valve seat 130 is formed at the end remote from the tappet 118. Arranged in the region between the insert 128 and the bottom of the bore hole 124 is a cylindrical closure element 132 which has an operating shaft 134 which engages in the interior of the insert 128 through the auxiliary valve seat 130 in a direction toward the tappet 118. Seated on the operating shaft 134 is a sealing ring 136 which interacts with the auxiliary valve seat 130 and rests on the end face of the closure element 132 at this side. On the side applied to the operating shaft 134, the closure element 132 has a blind hole 138, in which a compression spring 140 is arranged which, at one end, bears against the closure element 132 and, at the other end, against the bottom of the bore hole 124. The closure element 132 is displaceable in the longitudinal direction of the bore hole 124 and has a smaller diameter than the inside diameter of the bore hole 124 in the region of the closure element 132. The control line 68, 68' opens out into the respective space bounded by the insert 128 and the bottom of the bore hole 124, in which space the closure element 132 is situated. For reasons of completeness it should be mentioned that the diameter of the operating shaft 134 is smaller than the diameter of the outlet opening 142 bounded by the auxiliary valve seat 130. The interior of the insert 128 is connected via bore holes 144 extending in the radial direction to a circumferential collecting groove 146 which is in flow connection via the lines 96' with the outlet side of the mixing valve 146.

Sandwiched between the insert 128 and the end of the bearing sleeve 122 at this side is a cap-shaped, rubber elastic seal 148 which rests snugly with its cylindrical shoulder 148' on the surface of a circumferential groove on the tapered end region of the tappet 118 at this side.

When the lever 114 and tappet 118 are in a position of rest, the free end of the tappet 118 is lifted from the free end of the operating shaft 134, as is shown in FIG. 7. The relevant auxiliary valve 70, 70' is closed and the closure element 132, and thus the sealing ring 136, is pressed against the auxiliary valve seat 130 as a result of the prevailing water pressure and the surface which is effective in terms of pressure. This pressing is supported by the compression spring 140. This compression spring 140 could also be omitted, as there is always a force resulting in the closing direction of the auxiliary valve 70, 70' since the operating shaft 134 protrudes into the outlet side of the auxiliary valve 70, 70'.

In the region of the mixing valve 46, the auxiliary valve block 22 has a stepped, cylindrical blind bore hole 150 in which a hollow cylindrical journal 152 is inserted. The inner free end of this journal 52 is constructed as an annular mixing valve seat 154. Spaced away from the latter, the blind bore hole 150 has a circumferential shoulder which likewise serves as a mixing valve seat 154'. Provided between these two mixing valve seats 154, 154' is a disk 156 made of rubber elastic material which is seated on a lifting spindle 158. The lifting spindle 158 penetrates the front side of the journal 152 and has at its outer end a rotary knob 162. The lifting spindle 158 is mounted on the journal 152 by means of a thread 160 such that the lifting spindle 158 is displaced in the axial direction by rotation of the rotary knob 162, which results in the disk 156 being displaced nearer to the one or the other mixing valve seat 154 or 154' respectively. By this means, the free passage between the striking disk surfaces and the mixing valve seat 154, 154' is reduced or enlarged. The passage opening between the disk 156 and the mixing valve seat 154' is in connection with the exit 50 of the shutoff valve 40 for the hot water via the line 44. The passage opening between the disk 156 and the valve seat 154 is connected to the exit 50 of the shutoff valve 42 for the cold water by the hollow space in the interior of the journal 152, radial openings 164 in the central region of the journal 152 and the line 44'. The shell-shaped space between the blind bore hole 150 and the journal 152, which connects the openings 164 to the line 44', is sealed off by O-rings 106 which are inserted in corresponding grooves in the journal 152. Depending on the position of the disk 156 relative to the two mixing valve seats 154, 154' more or less cold or hot water can then flow into a mixing space 166 which opens out into the outlet line 24 and surrounds the two mixing valve seats 154, 154' and the journal 152. By this means, the desired temperature of the mixed water can be selected by rotating the rotary knob 162.

In order to seal off the interior space of the journal 152 against the outside in the region of the lifting spindle 158, the lifting spindle has a thickening 168 with a circumferential groove 168', in which an O-ring 106 is likewise inserted which slides on the inside wall of the hollow cylindrical journal 52.

The fitting according to FIGS. 7 and 8 functions as follows: when the lever 114 is in a position of rest, the auxiliary valves 70, 70' are closed. By this means, the hydraulic control circuit, i.e. feedline 20, 20'—passage 62—pilot control space 60—control lines 68, 68'—auxiliary valves 70, 70'—lines 96'—outlet line 24, of each shutoff valve 40, 42 is interrupted. Due to the passage 62, the pressure in the annular channel 48 and in the pilot control space 60 is equally great. As a result of the difference in surface area of the application of pressure in the region of the annular groove 48 and of the pilot control space 60, the closure part 56 is pressed onto the valve seat 52. The two shutoff valves 40, 42 block the flow of water through the fitting. If hands to be washed are then detected by a sensor according to FIG. 1, the control arrangement 28 passes a pulse to the drive member 34 constructed as a bistable solenoid, by means of which the plunger 112 is pulled into the solenoid and is retained there as a result of remanence. By this means, the lever 114 is swivelled into the operating position 114', which results in the free end of the tappet 118 contacting the free end of the operating shaft 134 after a particular stroke and displacing said operating shaft to the right together with the closure element 132 and the sealing ring 136 and lifting the sealing ring 136 from the auxiliary valve seat 130. The control circuit is thus opened and the water can emerge between the outlet opening 142 and the operating shaft 134 into the mixing space 166 connected to the outlet line 24. Since the cross-sections of flow between the pilot control space 60 and the outlet line 24 are greater than the cross-section of flow of the passage 62, the pressure in the pilot control space 60 then decreases which results in the closure part 56 being lifted from the relevant valve seat 52. The hot and cold water can then flow unhindered from the relevant annular channel 48 into the exit 50 and through the lines 44, 44' to the mixing valve 46. In the latter, as described above, the desired temperature of mixing of the water flowing out of the fitting through the outlet line 24 can be achieved by enlarging or reducing the allowed quantity of hot and cold water. By displacing the disk 156 to one mixing valve seat 154 or 154', it can then even be achieved that only cold or hot water flows out of the fitting.

If the washed hands are then removed from the range of the sensor 30, the control arrangement 28 again passes a pulse of opposite polarity to the bistable solenoid 34. The plunger 112 is displaced in a direction toward the outside, which results in the lever 114 being swivelled into the position of rest. In this case, the tappet 118 moves away from the free end of the operating shaft 134, by which means the closure element 132 with the sealing ring 136 is displaced in the figure toward the left as a result of the force of the compression spring 140 and the water pressure and, in this manner, the auxiliary valve 70 or 70' is closed. By this means, the hydraulic control circuit for the shutoff valve 40 or 42 is interrupted. Due to the connection through the passage 62, the pressure in the pilot control space 60 rises again to the same value as that of the water in the annular channel 48, which results in the closure element 56 being moved against the valve seat 52 and coming to rest on the latter In this case, the flow of water from the feedlines 20, 20' to the mixing valve 46 is slowly reduced and finally interrupted, which prevents pressure surges in the feedlines 20, 20'.

The two auxiliary valves 70, 70' are also driven by means of a single drive arrangement in this embodiment. Said drive arrangement has a bistable solenoid which is actuated by only short pulses of opposite polarity. This gives rise to only a very low energy requirement for operating the fitting. Bistable solenoids are generally known and commercially obtainable. When the lever 114 is in a position of rest, the free end of the tappet 118 is spaced away from the free end of the operating shaft 134. This results in initially only acceleration forces occurring when the plunger 112 is pulled into the solenoid 34 but not yet any forces for operating the auxiliary valves 70, 70'. Since the force of the solenoid on the plunger 112 increases the further the latter is situated in the interior of the solenoid, energy can be saved, in turn, by this measure since the solenoid can be of smaller dimensions or can be operated using smaller currents.

In both embodiments of the fitting illustrated in FIGS. 9 to 12, the auxiliary valve block 22 is arranged in each case on the side of the shutoff valve block 18. Provided above the shutoff valve block 18 is a mixing valve block 46' which is likewise attached to the shutoff valve block 18 by means of screws (not illustrated). Since the two variants differ essentially only by the drive arrangement 32 for the auxiliary valve 70, 70', the shutoff valve block, auxiliary valve block and mixing valve block 18, 22, 46' are described together.

The shutoff valve block 18 has a central block part 18", on which two partial blocks 18' of identical construction are arranged symmetrically. These parts 18', 18" are held together by means of screws 16' shown in FIGS. 9 and 11. The two shutoff valves 40, 42 for the hot water and cold water flowing through the feedlines 20, 20' are provided in the partial blocks 18' in recesses 54 which are open toward the central block part 18". The recess 54 has a step-wise taper of the diameter, in which the annular channel 48 is provided. The latter is connected in terms of flow to the relevant feedline 20, 20'. Seen in the radial direction, the annular channel 48 is bounded against the inside by an annular valve seat 52 which borders the exit 50 of the shutoff valve 40, 42. The exits 50 are connected via the corresponding lines 44, 44' to the mixing valve 46, which is only indicated diagrammatically in the mixing valve block 46'. The latter has the same construction as the mixing valve 46 shown in FIG. 8 and described in detail above. Provided in each recess 54 is a rubber elastic, diaphragm-shaped closure part 56 which interacts with the corresponding valve seat 52. The closure part 56 is held in a clamped manner along its circumference between a widening 54' and an annular retaining extension 170, engaging in the recess 54, of the block part 18". Together with the two closure parts 56, the two retaining extensions 170 arranged symmetrically in relation to each other bound the two pilot control spaces 60 of the shutoff valves 40, 42. The pilot control spaces 60 are connected in terms of flow to the relevant annular channel 48 by means of the passages 62 in the respective closure part 56. Provided in each pilot control space 60 is a compression spring 65 which is supported, on the one hand, on the block part 18" and, on the other hand, on the plate-shaped reinforcing member 64 which is snugly attached to the closure part 56 by means of a head-shaped extension 66 penetrating the closure part 56.

The two pilot control spaces 60 are connected to the auxiliary valves 70, 70' via control lines 68, 68' worked into the central block part 18" and in the auxiliary valve block 22. Each control line 68, 68' opens out into an approximately cylindrical bore hole 124, which is open toward the top, in the auxiliary valve block 22. The two bore holes 124 of an auxiliary valve block 22 are covered by means of a block-shaped covering element 172 made of a non-magnetizable material, for example brass. Worked into the covering element 172 are blind bore holes 124' aligned with the bore holes 124. Provided in the space bounded by the bore hole 124 and the blind bore hole 124' is the closure element 132 which interacts with the auxiliary valve seat 130 provided in the bottom end region in the bore hole 124. Arranged at the bottom end of the closure element 132 is a disk-shaped sealing element 136' which seals the outlet opening 142 bounded by the auxiliary valve seat 130 when the auxiliary valve 70, 70' is closed. Opposite the sealing element 136', the closure element 132 has a blind hole 138, in which a compression spring 140 is arranged which is supported at one end on the closure element 132 and, at the other end, on the covering element 172. Provided between the covering element 172 and the auxiliary valve block 22 are O-rings 106 in order to seal off the bore hole 124 and the blind bore hole 124' against the outside. The closure element 132 consists of a magnetic material, e.g. iron.

The auxiliary valve block 22 is attached to the block part 18" by means of a retaining screw 174' penetrating said block part 18". The end region facing away from the screw head engages in a thread 176 in a bore hole 178 in the auxiliary valve block 22. The bore hole 178 is connected via lines 96' to the outlet openings 142 of the two auxiliary valves 70, 70'. Provided in the shaft 174' of the screw 174 is a connection bore hole 180 which extends in the axial direction, is open toward the bore hole 178 and is open in the radial direction in the central region of the shaft 174'. This connection bore hole 180 is in flow connection through a further line 96", which is worked into the block part 18" and the mixing valve block 46', with the outlet line 24 which leads away from the mixing valve 46 in the mixing valve block 46'. Adjacent to the head of the retaining screw 174, a circumferential groove is provided in the shaft 174', in which circumferential groove an O-ring 106 is provided for sealing purposes. For reasons of completeness, it should be mentioned that O-rings or appropriate sealing elements are always provided for sealing purposes at the transition of a line or bore hole from one block or block part to another.

Figure 9:
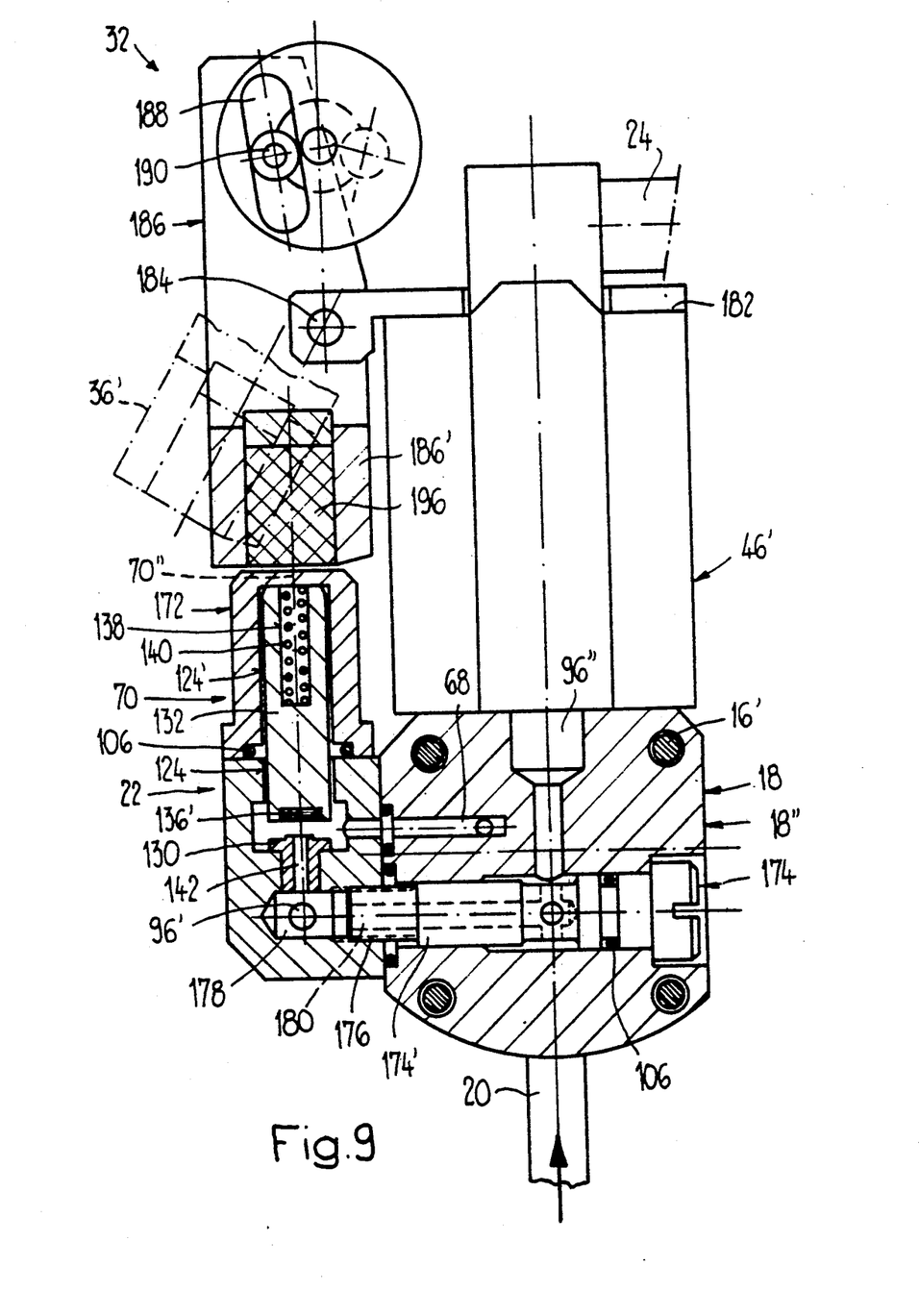
FIGS. 9 to 12 show two further embodiments of the fitting, in a front view and a lateral view respectively and partially cut open, the auxiliary valves being actuated via swivellable permanent magnets.
Figure 10:
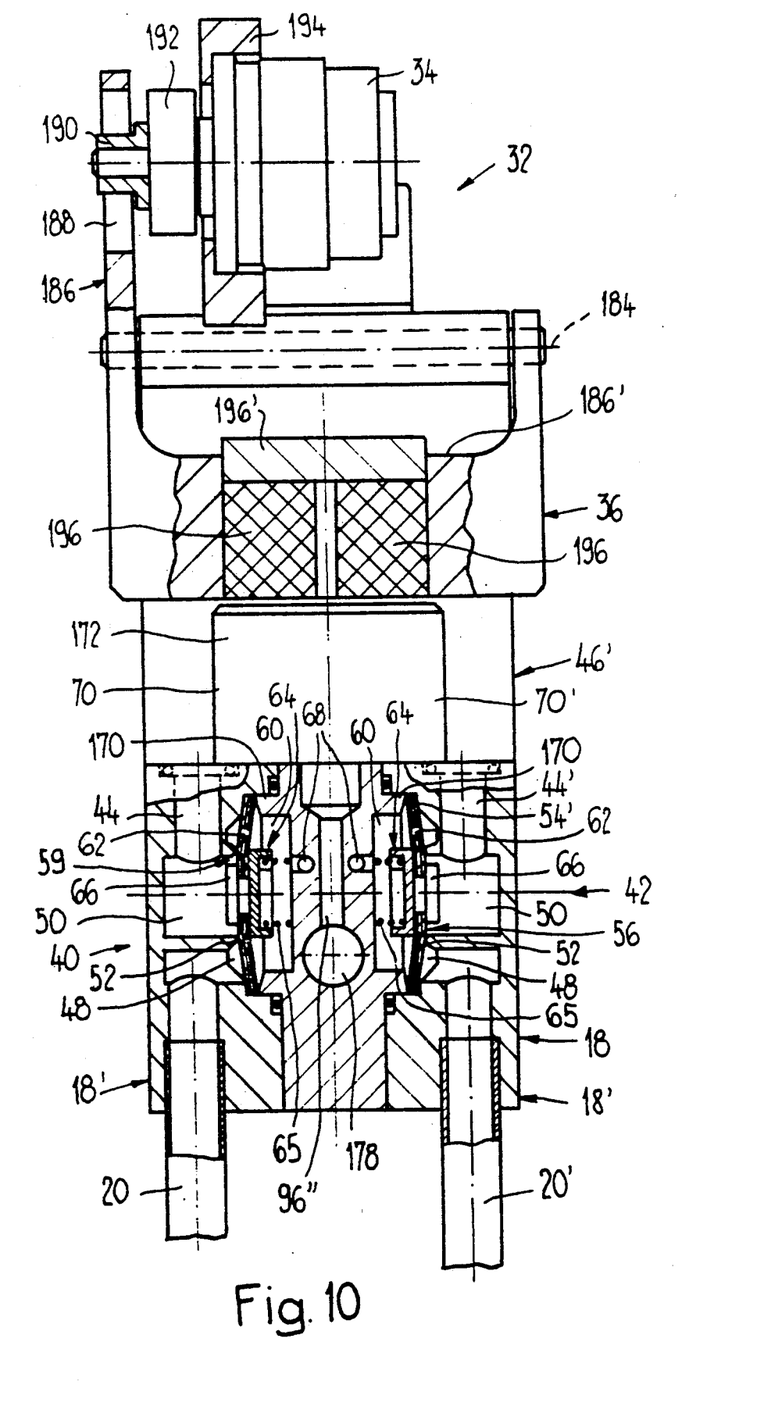

In the fitting shown in FIGS. 9 and 10, a bearing plate 182 is attached to the mixing valve block 46', on which bearing plate the transmission element 36, constructed as an essentially U-shaped lever, is mounted in a swivelling manner. The swivel axle 184 of this bearing extends at right angles to the axle 70" of the auxiliary valves 70, 70'. The one lateral limb 186 is extended beyond the swivel axle 184 in the form of a two-arm lever and has in its free end region a passage 188 in the form of an elongated hole. This passage 188 is penetrated by a guide journal 190 which is seated eccentrically on a disk-shaped output drive element 192. The output drive element 192 is seated on the output drive shaft of the drive member 34 constructed as a gear motor. Said drive member is held in a stationary manner by a retaining member 194 attached to the bearing plate 182. By rotation of the output drive element 192, the transmission element 36 can be swivelled from the operating position shown in the figures, in which the common limb 186' is situated adjacent to the top end of the covering element 172 of the auxiliary valves 70, 70', into a position of rest 36' indicated by dashed lines. Arranged in the common limb 186' are two permanent magnets 196 which are flush with the closure elements 132 of the auxiliary valves 70, 70' when the transmission element 36 is in an operating position. In this position, the permanent magnets 196 pull the closure elements 132 upwards against the force of the compression springs 140 and the resulting water pressure in order to open the auxiliary valves 70, 70' and to maintain them in the open position. This is shown in FIG. 9. By swivelling the transmission element 36 into the position of rest 36', the effect of the permanent magnets 196 on the closure elements 132 is reduced such that the latter move downward in the vertical direction and close the auxiliary valves 70, 70'. In order to reinforce the effect of the permanent magnets 196, the latter are interconnected by a yoke 196' on the side facing away from the auxiliary valves 70, 70'.

Figure 11:
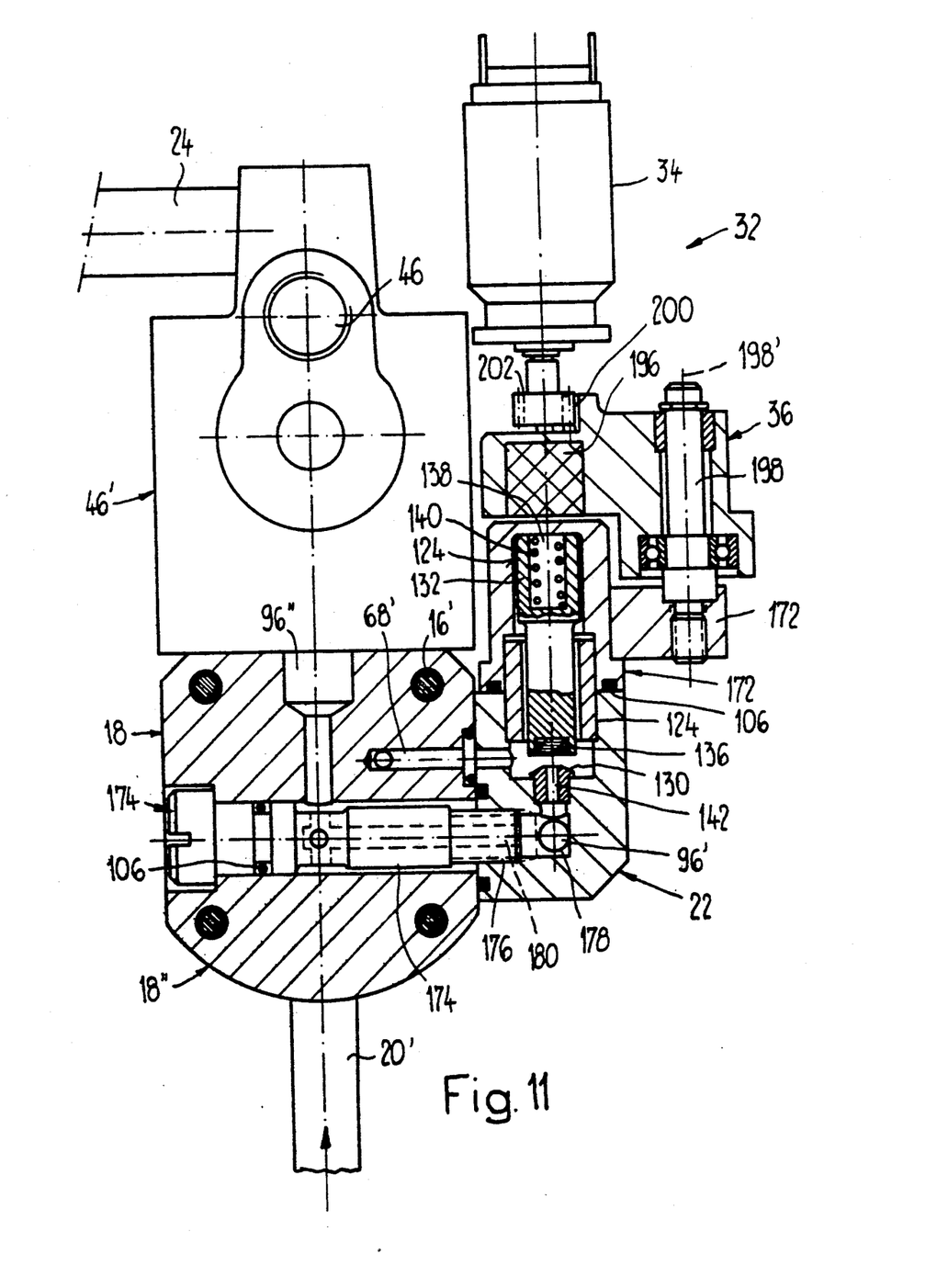
Figure 12:
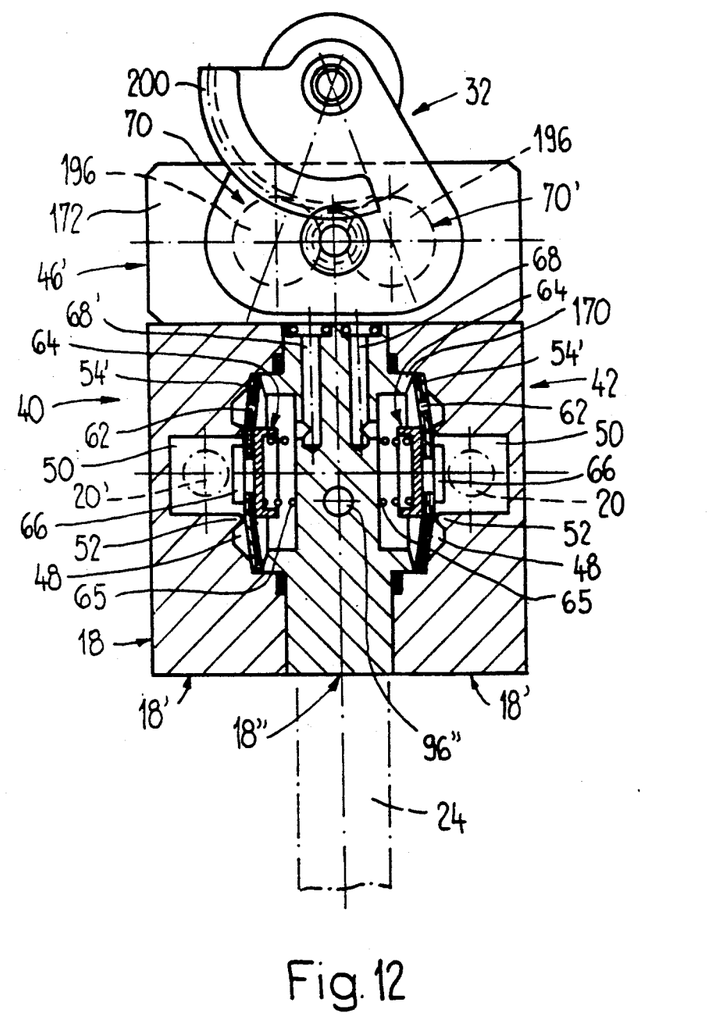

In the fitting according to FIGS. 11 and 12, a shaft 198 is attached to a retaining part 172' projecting outwards from the covering element 172, the axle 198' of which shaft extends parallel to the axles 70" of the auxiliary valves 70, 70'. Mounted on the shaft 198 is a swivel body forming the transmission element 36 which can be moved about the axle 198' into and out of an overlapping position with the covering element 172' of the auxiliary valves 70, 70' by means of the drive member 34 constructed as a motor. The transmission element 36 has an essentially triangular construction, the shaft 198 penetrating said transmission element in a corner region and a permanent magnet 196 being sunk into the two other corner regions of said transmission element. If the transmission element 36 is in the operating position shown in the figures, the two permanent magnets 196 are situated above the closure elements 132 of the auxiliary valves 70, 70' and pull the latter upward, as emerges, in particular, from FIG. 11. During this process, the auxiliary valves 70, 70' are opened. By means of the drive member 34, the transmission element 36 can be swivelled approximately by 90° out of the region of the auxiliary valves 70, 70' such that the permanent magnets 196 no longer act on the closure element 132. For this purpose, the transmission element 136 has a rack segment 200 which is concentric in relation to the axle 198', has the form of a segment of a circle and meshes with a pinion 202 which is seated on the output drive shaft of the drive member 34 constructed as a gear motor.

The two fittings shown in FIGS. 8 to 12 operate as follows: if there are no hands to be washed in the range of the sensor 30 (FIG. 1), the transmission elements 36 are swivelled into the position of rest 36', in which the permanent magnets 196 are situated outside the range of action on the auxiliary valves 170, 170'. As a result of its own weight, the force of the compression springs 140 and the resulting force of the water pressure, the closure elements 132 are pressed against the auxiliary valve seat 130. By this means, the hydraulic control circuits of the shutoff valves 40, 42 are interrupted. As a result of the passages 62, the water pressure in the pilot control spaces 60 corresponds to the water pressure in the annular channels 48, by which means the closure part 56 is pressed onto the valve seat 52 as a result of the different parts of the surface area of said diaphragm-shaped closure part 56 to which water is applied. During this process, the reinforcing member 64 prevents the closure part 56 from bulging into the region of the exit 50 and, by this means, avoids the closure part 56 formed from rubber elastic material being overstressed. The shutoff valves 40, 42 are closed. If the sensor 30 then detects hands to be washed, the control arrangement 28 sets the drive members 34 in motion such that the transmission element 36 is swivelled out of the position of rest 36' into the operating position shown in the figures. In this case, the permanent magnets 196 come to rest above the closure elements 132 of the auxiliary valves 70, 70' and pull the latter upward against the force of the compression spring 140, the dead weight and the resulting force of the water pressure, as is shown in FIGS. 9 and 11. The auxiliary valves 70, 70' are opened, by which means the control circuits of the shutoff valves 40, 42 are closed. Since the cross-sections of flow are greater downstream from the pilot control spaces 60 than the cross-sections of flow of the passage 62, the water pressure in the pilot control spaces 60 decreases gradually due to the water flowing out of the pilot control spaces 60 into the outlet line 24, such that the closure part 56 is lifted from the corresponding valve seat 52 as a result of the water pressure in the region of the annular channels 48. By this means, the water around the valve seat 52 can flow into the exit 50 and through the lines 44 or 44' to the mixing valve 46 and the outlet line 24. If the washed hands are then removed from the range of the sensor 30, the control arrangement 28 again sets the drive member 34 in motion, by which means the transmission elements 36 are swivelled into the position of rest 36'. During this process, the permanent magnets 196 pass out of the range of action on the closure elements 132. As a result of the force of the compression spring 140 and of its own weight, said closure elements move downward in a direction toward the auxiliary valve seats 130. They come to rest on said auxiliary valve seats and, supported by the water pressure, are pressed onto them. The auxiliary valves 70, 70' are closed and the control circuits for the shutoff valves 40, 42 are interrupted. The water flowing through the passage 62 into the pilot control space 60 results in the pressure in the pilot control space 60 gradually coming to equal the pressure of the inflowing water in the annular channel 48 again. By this means, the closure part 56 is gradually brought to rest on the valve seat 52, by which means the flow of water is interrupted and the shutoff valves 40, 42 are closed. The slow opening and closing of the shutoff valves 40, 42 prevent surges in the feedlines 20, 20'.

Since the permanent magnets 196 are swivelled approximately at right angles to the pulling force onto the closure elements 132 out of the range of action on said closure elements, extremely little energy is required for operating the fitting. Moreover, in the embodiment according to FIGS. 9 and 10, the two permanent magnets 196 can be slightly offset in relation to each other in the swivel direction in order always to open the auxiliary valve 70' first and to ensure that the other auxiliary valve 70 is always closed first. This avoids the hands being scalded. In the embodiment according to FIGS. 11 and 12, the permanent magnet 196 assigned to the auxiliary valve 70 always passes over the auxiliary valve 70' first when the transmission element 36 is swivelled from the position of rest into the operating position. This results in the auxiliary valve 70' again being opened first and also the other auxiliary valve 70 being opened only subsequently. When the transmission element 36 is swivelled into the position of rest, the permanent magnet 196 assigned to the auxiliary valve 70 also swivels over the other auxiliary valve 70', by which means it is again ensured that the flow of cold water is always opened first and the flow of hot water is always closed first.

In the embodiment according to FIGS. 9 and 10, the drive member 34 constructed as a direct current motor can always rotate in the same direction of rotation for swivelling the transmission element 36 which simplifies the control arrangement 28. In the fitting according to FIGS. 11 and 12, the control arrangement 28 must be able to drive the direct current motor in both directions of rotation. In order to be able to simplify the control arrangement 28 further, it is possible to pick up the end positions of the transmission element 36 with reed relays, similar to that shown in FIG. 6.

In all the fittings shown in the figures, the shutoff valves 40, 42 are constructed as diaphragm valves. It is, of course, also conceivable for the closure parts of the shutoff valves to be of piston-type construction. The passage in the closure part can be replaced by a line between the relevant feedline 20, 20' and the pilot control space 60. In this case, it is also possible to provide the auxiliary valves in the control circuit for the shutoff valves between the feedlines 20, 20' and the pilot control spaces. The shutoff valves must then be constructed in such a way that they are retained in the closing position for example by means of springs and are passed into the open position when the auxiliary valves are opened. This can take place, for example, by means of an auxiliary piston operable by water pressure in the control circuit. Moreover, it is also possible for the drive members to be of different construction. For example, the direct current gear motors can be exchanged for solenoids or vice versa.

The shutoff valve block 18 and auxiliary valve block 22 or mixing valve block 46' are advantageously of cuboid construction. The latter can then be machined individually in an advantageous manner using conventional, numerically controlled machinery or machine stations. The separation of the auxiliary valves from the shutoff valves allows a simple and operationally reliable construction of the fittings.

What is claimed is:

1. An electrically controlled sanitary fitting having a hot water inlet and a cold water inlet and an outlet and having in each case one hydraulically operable shutoff valve arranged between the relevant inlet and the outlet for releasable blocking of the hot and cold water flow, the hydraulic control circuit of which shutoff valve is connected to the relevant inlet and the outlet and can be closed or interrupted by means of an auxiliary valve for opening and closing the shutoff valve which auxiliary valve is operable by a drive arrangement (32) fed by electricity, wherein a common drive arrangement (32) fed by electricity is provided for both auxiliary valves (70, 70'), each shutoff valve (40, 42) having a diaphragm-shaped or piston-shaped closure part (56), on the one side of which there is provided a valve seat (52)

interacting with the closure part (56) and, on the other side, a pilot control space (60) which is connected to the respective inlet (20,20') via a passage (62), can be connected via the auxiliary valve (70,70') to the outlet (24) to open the shutoff valve (40,42) and can be separated from said outlet for closing the shutoff valve, the auxiliary valves being apart from the pilot control spaces, wherein the drive arrangement (32) has a drive member (34) fed by electricity and a transmission element (36) which is in effective connection with said drive member and acts on both auxiliary valves (70,70'), wherein the drive member (34) has a solenoid arrangement with a plunger (112) which operates both auxiliary valves (70, 70') via a transmission linkage (114), and wherein each auxiliary valve (70, 70') has a stationary, annular auxiliary valve seat (130) and a closure element (132) interacting with said auxiliary valve seat having an operating shaft (134) extending through the auxiliary valve seat (130).

2. The fitting as claimed in claim 1, wherein the transmission linkage (114) for each auxiliary valve (70, 70') has a tappet (118) which, in its position of rest, is lifted from the relevant operating shaft (134) and, when it is moved into the operating position (114') contacts the operating shaft (134) to operate the closure element (132).

3. The fitting as claimed in claim 2, wherein the end of the operating shaft (134) facing the tappet (118) is provided on the outlet side relative to the auxiliary valve seat (130).

4. An electrically controlled sanitary fitting having a hot water inlet and a cold water inlet and an outlet and having in each case one hydraulically operable shutoff valve arranged between the relevant inlet and the outlet for releasable blocking of the hot and cold water flow, the hydraulic control circuit of which shutoff valve is connected to the relevant inlet and the outlet and can be closed or interrupted by means of an auxiliary valve for opening and closing the shutoff valve which auxiliary valve is operable by a drive arrangement fed by electricity, wherein a common drive arrangement (32) fed by electricity is provided for both auxiliary valves (70, 70'), the drive arrangement (32) having a drive member (34) fed by electricity and a transmission element (36) which is in effective connection with said drive member and acts on both auxiliary valves (70, 70'), the auxiliary valves (70, 70') being operable magnetically, and the transmission element (36) having a permanent magnet arrangement (196) which can be brought into and out of action on the auxiliary valves (70, 70') by means of the drive member (34).

5. The fitting as claimed in claim 4, wherein the direction of movement of the permanent magnet arrangement (196) extends transversely in relation to the direction of the action of force on the auxiliary valves (70, 70').

6. An electrically controlled sanitary fitting having a hot water inlet and a cold water inlet and an outlet and having in each case one hydraulically operable shutoff valve arranged between the relevant inlet and the outlet for releasable blocking of the hot and cold water flow, the hydraulic control circuit of which shutoff valve is connected to the relevant inlet and the outlet and can be closed or interrupted by means of an auxiliary valve for opening and closing the shutoff valve which auxiliary valve is operable by a drive arrangement fed by electricity, wherein a common drive arrangement (32) fed by electricity is provided for both auxiliary valves (70, 70'), the fitting having a ceramic disk valve (72) having two ceramic disks (74, 74') which are located next to each other and can be rotated counter to each other by means of the drive arrangement (32) and on which the two auxiliary valves (70, 70') are constructed.

7. The fitting as claimed in claim 6, wherein each shutoff valve (40,42) has a diaphragm-shaped or piston-shaped closure part (56), on the one side of which there is provided a valve seat (52) interacting with the closure part (56) and, on the other side, a pilot control space (60) which is connected to the respective inlet (20, 20') via a passage (62), can be connected via the auxiliary valve (70, 70') to the outlet (24) to open the shutoff valve (40, 42) and can be separated from said outlet for closing the shutoff valve, the auxiliary valves being apart from the pilot control spaces, and one ceramic disk (74) is arranged fixedly and has in each case a control passage (94, 94') connected to the corresponding pilot control space (60) and the other ceramic disk (74) is constructed to be rotatable and is provided with a control groove (92) connected to the outlet (24), which control groove can be brought into and out of flow connection with the two control passages (94, 94') by rotating the ceramic disk (74').

8. The fitting as claimed in claim 7, wherein the fixedly arranged ceramic disk (74) has a passage opening (96) connected to the outlet (24) in the region of the rotating axle (88) of the rotatable ceramic disk (74'), the two control passages (94, 94') connected to the pilot control rooms (60) are located approximately diametrically opposite each other but slightly offset relative to this rotating axle (88), and the control groove (92) is constructed so as to be wider in the region of these control passages (94, 94') in order always to open the shutoff valve (42) for the cold water first and always to close that for the hot water (40) first.

9. The fitting as claimed in claim 6, wherein the drive arrangement (32) has an electric gear motor which is connected to the ceramic disk valve (72) via a crank mechanism (98, 100, 102).

10. An electrically controlled sanitary fitting having a hot water inlet and a cold water inlet and an outlet and having in each case one hydraulically operable shutoff valve arranged between the relevant inlet and the outlet for releasable blocking of the hot and cold water flow, the hydraulic control circuit of which shutoff valve is connected to the relevant inlet and the outlet and can be closed or interrupted by means of an auxiliary valve for opening and closing the shutoff valve which auxiliary valve is operable by a drive arrangement fed by electricity, wherein a common drive arrangement (32) fed by electricity is provided for both auxiliary valves (70, 70'), and wherein a mixing valve (46) is connected downstream from the two shutoff valves (40, 42).

11. The fitting as claimed in claim 10, wherein the mixing valve (46) has two feedlines (44, 44') which are connected in terms of flow in each case to one shutoff valve (40, 42) and which are bounded by annular mixing valve seats (154, 154') which are spaced apart, are essentially aligned with one another and are directed counter to one another, and a disk (156) which is displaceable back and forth between the mixing valve seats (154, 154') and interacts with its lateral surfaces with said mixing valve seats, the region between the mixing valve seats (154, 154') being connected to the outlet (24).

12. The fitting as claimed in claim 10, wherein the shutoff valves (40, 42) and the auxiliary valves (70, 70') are each arranged in a block (18, 22) which can be manufactured individually and the blocks (18, 22) located next to each other are connected to each other, wherein the connection lines (68, 68') between the shutoff valves (40, 42) and the auxiliary valves (70, 70') are provided in the blocks (18, 22), and the auxiliary valves (70, 70') and the mixing valve (46) are provided in the same block (22) and the feedlines (44, 44') from the shutoff valves (40, 42) to the mixing valve (46) are worked out of the blocks (18, 22).

13. An electrically controlled sanitary fitting having a hot water inlet and a cold water inlet and an outlet and having in each case one hydraulically operable shutoff valve arranged between the relevant inlet and the outlet for releasable blocking of the hot and cold water flow, the hydraulic control circuit of which shutoff valve is connected to the relevant inlet and the outlet and can be closed or interrupted by means of an auxiliary valve for opening and closing the shutoff valve which auxiliary valve is operable by a drive arrangement (32) fed by electricity, wherein a common drive arrangement (32) fed by electricity is provided for both auxiliary valves (70, 70'), each shutoff valve (40, 42) having a diaphragm-shaped or piston-shaped closure part (56), on the one side of which there is provided a valve seat (52) interacting with the closure part (56) and, on the other side, a pilot control space (60) which is connected to the respective inlet (20,20') via a passage (62), can be connected via the auxiliary valve (70,70') to the outlet (24) to open the shutoff valve (40,42) and can be separated from said outlet for closing the shutoff valve, the auxiliary valves being apart from the pilot control spaces, wherein the drive arrangement (32) has a drive member (34) fed by electricity and a transmission element (36) which is in effective connection with said drive member and acts on both auxiliary valves (70, 70'), wherein the drive member (34) has a solenoid arrangement with a plunger (112) which operates both auxiliary valves (70, 70') via a transmission linkage (114), and wherein the solenoid arrangement is of a bistable type.

14. A fitting as claimed in claim 11 wherein the disk (156) is formed from rubber elastic material.

* * * * *